(12) United States Patent
Morgan et al.

(10) Patent No.: US 6,522,340 B1
(45) Date of Patent: Feb. 18, 2003

(54) CREATING REAL-WORLD OBJECTS

(75) Inventors: Scott Anthony Morgan, Austin, TX (US); Craig Ardner Swearingen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 950 days.

(21) Appl. No.: 08/753,081

(22) Filed: Nov. 20, 1996

(51) Int. Cl.$^7$ ............................................. G06T 15/00
(52) U.S. Cl. ......................................................... 345/620
(58) Field of Search ................................. 345/434, 348, 345/629, 219, 620, 625, 627

(56) References Cited

U.S. PATENT DOCUMENTS

| | | | |
|---|---|---|---|
| 5,031,117 A | 7/1991 | Minor et al. | 364/521 |
| 5,138,699 A | 8/1992 | Minor et al. | 395/131 |
| 5,220,646 A | 6/1993 | Fossum | 395/122 |
| 5,245,700 A | 9/1993 | Fossum | 395/122 |
| 5,276,783 A | 1/1994 | Fossum | 395/123 |
| 5,283,860 A | 2/1994 | Einkauf et al. | 395/134 |
| 5,347,295 A | 9/1994 | Agulnick et al. | 345/156 |
| 5,402,477 A | 3/1995 | McMahan et al. | 379/201 |
| 5,416,895 A | 5/1995 | Anderson et al. | 395/148 |
| 5,461,666 A | 10/1995 | McMahan et al. | 379/67 |
| 5,463,724 A | 10/1995 | Anderson et al. | 395/148 |
| 5,502,805 A | 3/1996 | Anderson et al. | 395/148 |
| 5,613,052 A * | 3/1997 | Narayanaswami | 395/134 |
| 5,701,404 A * | 12/1997 | Stevens et al. | 395/123 |
| 5,737,553 A * | 4/1998 | Boutok | 345/438 |

OTHER PUBLICATIONS

"Dial 1–800–Internet", BYTE Magazine, Feb., 1996, pp. 83–88.

"Hey Baby, Call Me at My IP Address", BYTE Magazine, Apr., 1996, pp. 142–144.

* cited by examiner

*Primary Examiner*—Phu K. Nguyen
(74) *Attorney, Agent, or Firm*—Mark E. McBurney; Volel Emile; Leslie A. VanLeeuwen

(57) ABSTRACT

The present invention is a system and method for creating a real-world object as a bitmap image are provided. Initially, the background pixels in the frame buffer are assigned the same color which is different from any color found in the object. A region is created corresponding to the area that the object will occupy. Next, an application window is created on the desktop having borders, title bar, scroll bar, and the like. The size of the window will correspond to the dimensions of the bitmap image. A clipping function is then implemented to remove all of the areas in the application window which do not correspond to the bitmap image.

19 Claims, 9 Drawing Sheets

FIG. 7A

- STEP 1: START
- STEP 2: CREATE A BITMAP THAT CONTAINS A REAL-WORLD OBJECT. THE BACKGROUND OF THE BITMAP SHOULD ALL BE THE SAME COLOR. THIS COLOR SHOULD NOT BE FOUND IN THE REAL-WORLD OBJECT.
- STEP 3: WITHIN THE SOFTWARE PROGRAM, LOAD THE BITMAP.
- STEP 4: CREATE A TOP-LEVEL WINDOW (HAS SIZEBORDERS, TITLE BAR, ETC.)
- STEP 5: MAKE THE WINDOW HAVE THE CLIENT SIZE BE THE SAME DIMENSIONS AS THE BITMAP THAT WAS LOADED.
- STEP 6: LOAD THE BITMAP BITS
- STEP 7: GET A DRAWING DEVICE CONTEXT (DC) FOR THE WINDOW.
- STEP 8: BEGIN A PATH WITHIN THE DC
- STEP 9: FOR EACH ROW OF BITS IN THE BITMAP
- STEP 10: FOR EACH COLUMN OF BITS IN THE BITMAP
- STEP 11: LOOK FOR BITS THAT ARE PART OF THE REAL-WORLD OBJECT. DRAW LINES WITHIN THE DC THAT CONNECT THE BITS ON THIS LINE THAT ARE PART OF THE REAL-WORLD OBJECT.

A   B   C

CREATING REAL-WORLD OBJECTS

CROSS REFERENCE TO RELATED APPLICATIONS

The present application is related to the following applications: Ser. No. 08/753,082, entitled "Data Processing System and Method for Controlling a View of a Realistic Object in a Display Device"; Ser. No. 08/753,077, entitled "Prioritization of Background Display During Animation"; Ser. No. 08/753,122, entitled "Multifunctional Object"; Ser. No. 08/753,076, entitled "System and Method for Maintaining Size and Position Relationships for Non-Rectangular Real World Objects"; Ser. No. 08/753,124, entitled "Data Processing System and Method for Scaling a Realistic Object on a User Interface"; Ser. No. 08/753,078, entitled "Data Processing System and Method for Viewing Objects on a User Interface"; Ser. No. 08/753,079, entitled "Data Processing System and Method for Performing Automatic Actions in a Graphical User Interface"; and Ser. No. 08/753,123, entitled "A Data Processing System and Method for Modifying a Size of a Realistic Object on a User Interface". All of the above applications are being filed on the same date as the present application and assigned to the assignee of the present application.

BACKGROUND OF THE INVENTION

The present invention relates to a data processing system for creating a representation of a real-world, non-standard, complex object in a graphical user interface (GUI). More particularly, a process is utilized that allows a bit mapped image to be placed inside a standard window wherein only the bit mapped image is visible.

Object oriented programming is a known technology which encapsulates data and methods into a programming entity called an object. By protecting certain methods and data through a public interface, an object oriented program can insulate each component from changes to other components yet provide the needed functions with a minimum of reprogramming. For more background information on object oriented technologies, concepts and conventions, please see the following references, *Object Oriented Design with Applications*, Grady Booch (The Benjamin/Cummins Publishing Company, 1990) and *Object Oriented Software Construction*, by B. Meyer, (Prentice Hall, 1988).

Typically, in graphical user interfaces, everything is present in terms of windows, which include items such as a size border, rectangular client, menu, title bar and the like. These items are not found in real-world objects, such as a telephone or a book that sits on a user's desk. Current data processing technology is moving towards displaying these real-world objects on the computer screen. It is very desirable to have the real-world object on the GUI desktop appear very similar to what a user experiences in real life.

Graphic images are normally rendered using a plurality of interconnected geometric shapes. That is, a set of lines and polygons are input by software to a graphics engine that displays these images on a computer monitor. For example, a circle may be drawn by rendering a series of vertical, horizontal and diagonal lines in their appropriate relationship. More complex shapes are generally drawn using a variety of triangle, trapezoids, lines, rectangles and the like to create an image. U.S. Pat. No. 5,276,783 discusses tessellating complex images into rectangular areas that can be filled by conventional graphics adapters.

U.S. Pat. No. 5,283,860 displays trimmed surfaces after a three-dimensional surface has ben tesselated into triangles. A polygon trimming mask is formed using an XOR operation to set the bits in a mask plane. The bits in the mask are compared with the bits in the frame buffer and the rendering hardware draws the pixels corresponding to the bits in the mask plane.

Conventional data processing systems do utilize known, familiar images, such as notebook pages in their graphical user interfaces. However, these conventional techniques utilize existing methods of associating related lines, rectangles, triangles and other polygons to create the image. Often, any curved edges of the objects displayed, using prior art techniques, are jagged since a series of connected angular lines are associated to form the curve.

The majority of "real-world" physical objects that are encountered by computer users include at least one curved edge. As computers become more sophisticated it is desirable to represent more and more physical objects by a graphical user interface. To ensure that user's (both sophisticated and unsophisticated) are comfortable with the emerging software technologies, it is advantageous to make the displayed objects as realistic as possible.

Therefore, it can be seen that a need exists for a system and method which provides for the creation of any "real-world" type image, regardless of the presence of any curved edges.

SUMMARY OF THE INVENTION

In contrast to the prior art, the present invention provides a system and method for creating an object in an application window wherein the window boundaries are invisible to a user.

Broadly, the present invention provides for the creation of an object as a bitmap image where the background pixels have the same color and are different from any color found in the object. A region is created corresponding to the area that the object will occupy. Next, an application window is created on the desktop having borders, title bar, scroll bar, and the like. The size of the window will correspond to the dimensions of the bitmap image. A clipping function is then implemented to remove all of the areas in the application window which do not correspond to the bitmap image.

Therefore, in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIGS. 7A, 7B and 7C are flowcharts of the process implemented by the present invention to create functional objects which represent corresponding physical objects.

DETAILED DESCRIPTION OF THE PREFERRED EMBODIMENTS

Figure 1:
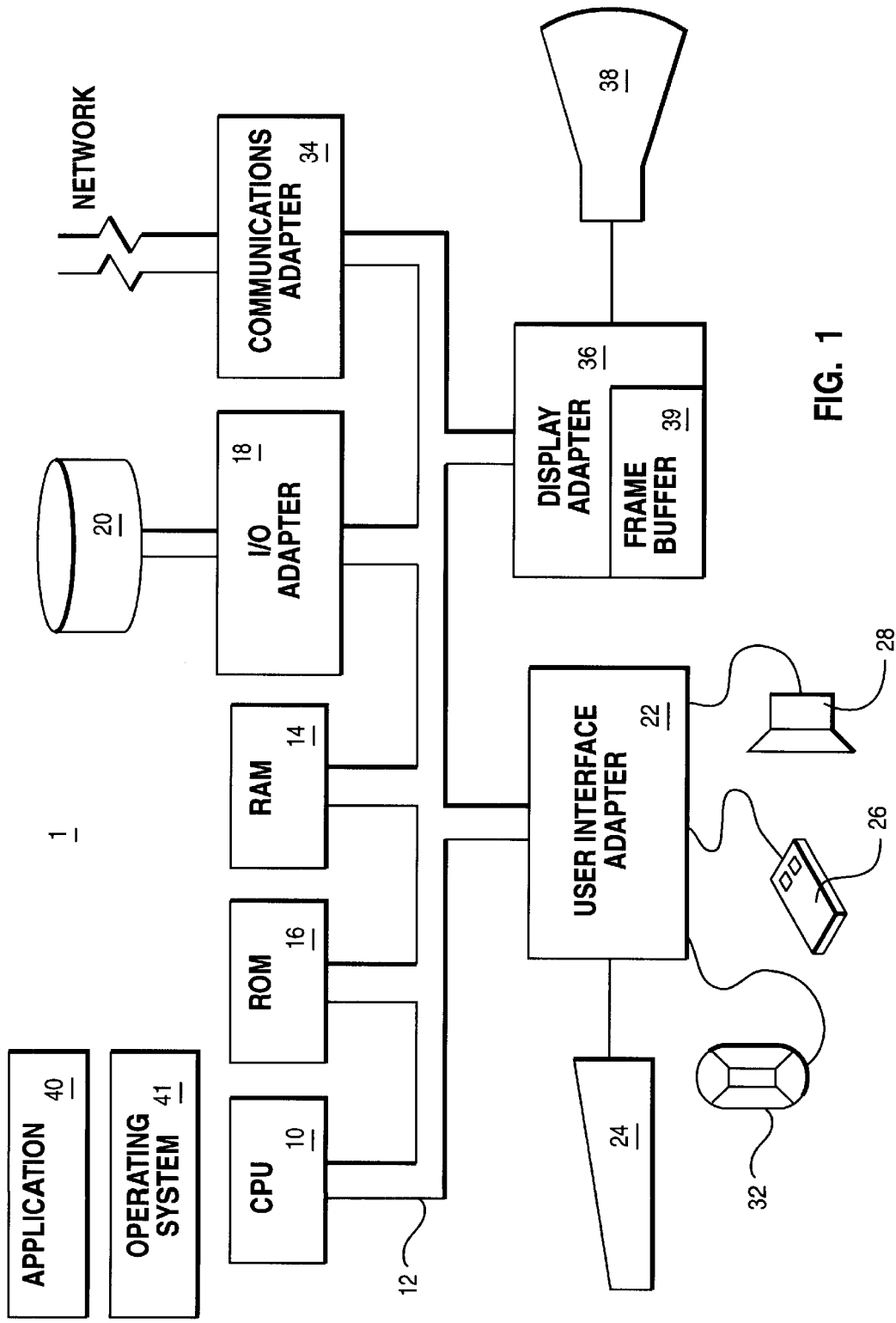
FIG. 1 is a block diagram of a data processing system including a central processing unit (CPU) which is capable of implementing the present invention.

The telephone object of the present invention is a user interface design for a new, real-world user interface style. It is built using C++ and implements a reusable framework. A shortcut function allows the properties page of the telephone's shortcut icon to assign a shortcut key. This will allow a user to access the phone at any time. For example, the shortcut key will bring the telephone to the top when it is covered by other windows. Also, the phone will automatically answer if it's ringing when the user presses the shortcut key.

Additionally, one embodiment of the telephone object of the present invention will allow the object to be fully displayed during moving and sizing. This dynamic display of the object during sizing can be implemented by using a software program such as "Plus" from Microsoft Corp. It is also possible to display the traditional outline box during resizing.

During dialing, the user can insert a pause by entering a comma (,) for a 2 second pause or semicolon (;) to wait for another dial tone.

Telephone numbers are often made up of names or acronyms that are easy to remember, but difficult to dial on a real phone (for example, 1-800-CALLIBM). With the telephone object of the present invention a user can just type the letters on the keyboard. The present invention translates the letters to the desired phone number, and automatically dials the number.

The telephone object of the present invention is also capable of combining speed dial numbers with numbers keyed in by the user. For example, if 9 must be dialed to get an outside line, a user can just enter the numeral 9 and then select the speed dial button.

The present invention is implemented such that a user can close the "object", if required by the specific operating system. However, the present invention supports operating systems wherein closing the object by the user is not a necessity. In a preferred embodiment the telephone object of the present invention supports closing the object as required by the majority of current operating systems, such as Windows 95 (available from Microsoft Corp). This closing, and other functions, is implemented through a pop-up menu. Just select the telephone object (e.g. by clicking a first mouse button over the object to see the pop-up menu, and then clicking a second button over the option to be selected by the user.

The telephone object of the present invention has been designed to work in much the same way as a physical telephone located on a desk, wall, car or pocket. But, unlike a physical telephone, it works through the computer. The present invention takes advantage of the functions that computers are so good at, such as remembering names and numbers, finding and entering (dialing) the number quickly. The present invention allows a user to answer and place calls without picking up a physical handset.

Some of the differences between the present invention and other telephone applications are that the telephone object of the present invention always displays the image of a real telephone regardless of how the user is currently interacting with it. Further, the object of the present invention does not need a window border around it; it sits right on your desktop. It is recognizable at any size, and can be made as big or as small as desired without interfering with its functions. Even when the object is displayed as an icon, it can be used to answer calls or dial the user's speed-dial numbers, or to dial a number manually using the keyboard.

A user can dial numbers manually either by clicking on the phone object's keypad with the mouse, or by using the computer's number keys. (You can even type in the letters for telephone numbers such as 1-800-CALLIBM.) When a person being called answers, just start talking. The present invention telephone object uses the microphone and speaker provided with the user's computer system such that hands-free conversation is possible. When the user has completed the telephone conversation click on the handset portion of the object to hang up.

To receive an incoming call, the user answers by again selecting the handset portion of the object and begin talking.

The present invention also includes a speed-dial function. The speed-dial can be set during the time period when a telephone conversation is occurring or after the call is finished. The speed-dial may be set to allow access to numbers which are called often, or to emergency numbers. To set the speed-dial function, click on the handle portion of the drawer, which is located at the bottom edge of the telephone object. The drawer will slide open, displaying an area where the speed-dial buttons can be set. That is, type the name of the person, or entity, to which speed-dial access is desired, then fill in the desired telephone number in the Number field and press the Add Name button. The name and number will appear in the list above the entry fields. Next, press the Set Speed Dial key. In response, the speed-dial buttons will flash. Select the button you want to assign to this speed-dial number. The name and number entered by the user will appear beside its associated speed-dial button. When the speed-dial number is set, the user selects the handle of the drawer to return it to its original position.

The telephone object of the present invention can be displayed as it first appeared, with both the number pad and the speed-dial buttons, or in a simpler state, the base function view. To change between these presentations, a toggle switch located on the telephone object just above the speed-dial buttons is selected. In order to stretch or shrink the telephone object, the user can move the mouse pointer over any edge of the phone object. The pointer will change to a diagonally oriented sizing pointer. While this new pointer is showing, press down the left mouse button and drag the edge of the telephone object to change its size. No matter how large or small you make it, the telephone object can still be used.

In a preferred embodiment, the present invention is implemented in the C++ programming language using object oriented programming techniques. C++ is a compiled language. The programs are written in human readable script and this script is provided to another program called a compiler to generate a machine readable numeric code which can be loaded into, and directly executed by the computer. The C++ language possesses certain characteristics which allow a software developer to easily use programs written by others while still provided a great deal of control over the reuse of programs to prevent their destruction or improper use. The C++ language is well known and many articles and text are available which describe the language in detail.

As known by those skilled in the art, object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related methods are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B. Thus, three separate method definitions can be written, one for each type of variable (numbers, characters and dollars). After the methods have been defined, a program can later refer to the addition method by its common format (A+B) and, during compilation, the C++ compiler will determine which of the three methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such predefined classes and libraries are typically called "frameworks" and essentially provide a prefabricated structure as a basis for creating a working application program.

For example, a framework for a user interface might provide a set of predefined graphic interface objects which create windows, scrollbars, menus and the like, and provide the support and "default" behavior for these graphical interface objects. Since many frameworks are based on the object oriented techniques, the predefined classes can be used as base classes and the built in default behavior can be inherited by developer defined subclasses and either modified or overridden to allow developers to extend the framework and create customized solutions in a particular area of expertise. This object oriented approach provides a major advantage over traditional programming since the programmer is not changing the original program, but rather extending the capabilities of the original program. In addition, the framework provides architectural guidance and modeling and, at the same time, frees the developers to supply specific actions unique to the problem domain.

Therefore, those skilled in the art will understand how the present invention is implemented using object oriented programming techniques as described above.

Referring to FIG. 1, a typical data processing system is shown which may be used in conjunction with the present invention. A central processing unit (CPU), such as one of the PowerPC microprocessors available from IBM Corporation (PowerPC is a trademark of IBM) is provided and interconnected to various other components by system bus 12. An operating system 41 runs on CPU 10 and provides control and is used to coordinate the function of the various components shown in FIG. 1. Operating system 41 may be one of the commercially available operating systems such as DOS, or the OS/2 operating system available from IBM Corporation (OS/2 is a trademark of the IBM Corporation). A program application 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that there is software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. Input/output devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter, (not shown) and the like. By using the aforementioned I/O devices, a user is capable of inputting information to the system through the keyboard 24, trackball 32 or mouse 26 and receiving output information from the system via speaker 28 and display 38.

Figure 2:
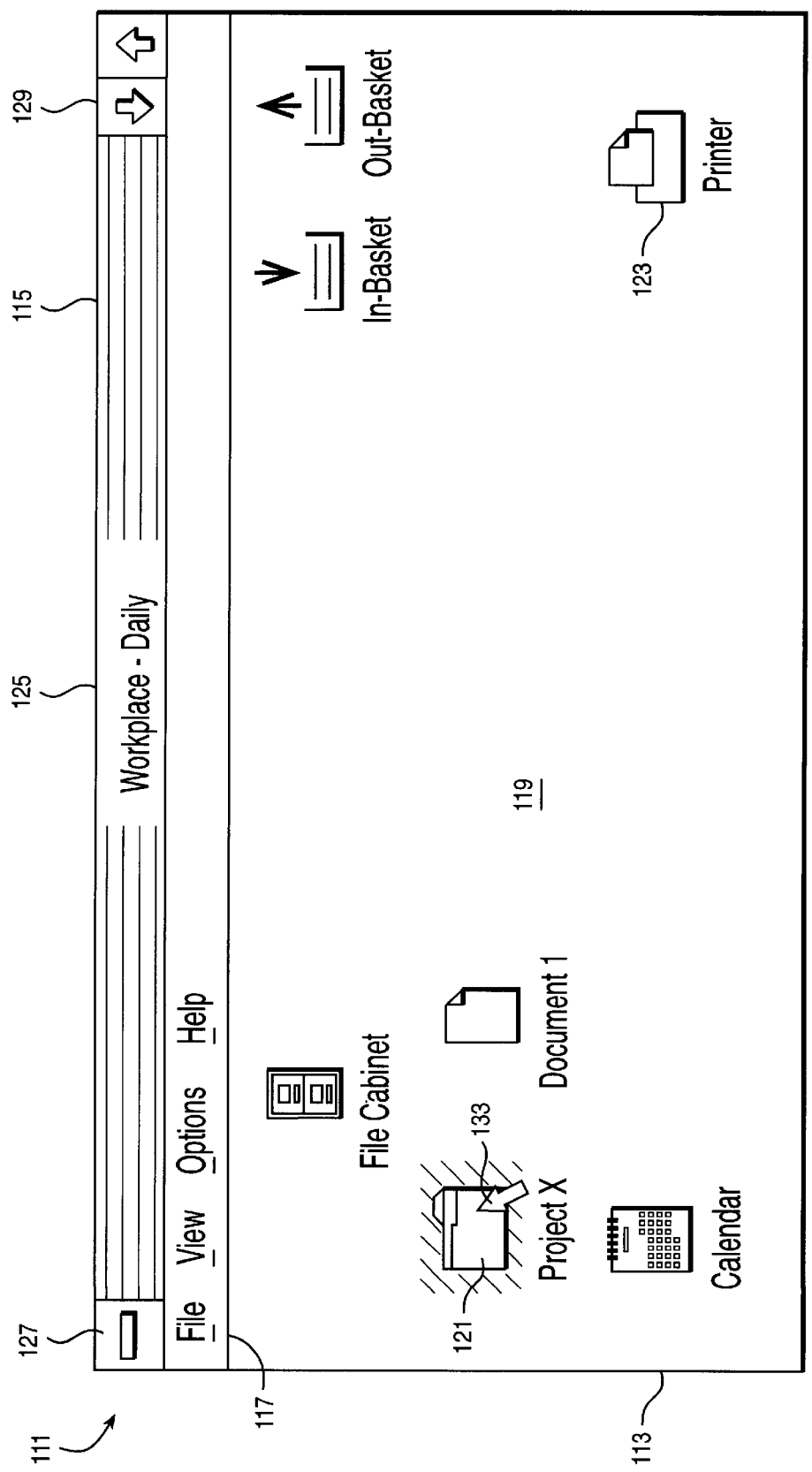
FIG. 2 shows a typical GUI with a workplace window having the various objects that are included on the user's workplace.

Referring to FIG. 2, the window is designated generally by the numeral 111. Window 111 includes a border with frame 113 that forms the outer boundary of the window. Contained within border 113 are a title bar 115 and an action bar 117. The remainder of window 111 consists of a client area 119, which is populated with a plurality of icons, including a folder icon 121, which is labeled "project X", and a printer icon 123.

Title bar 115 includes a window title 125 which identifies the window, a system menu icon 127 and window sizing icon 129. System menu icon 127 allows the user to display a pull-down menu containing actions that the user can perform on the window. Such actions are related to the window itself and not to the object that is displayed in the window. For example, actions include MOVE, which allows the user to reposition the window on the screen, MINIMIZE, which reduces the window's size, and MAXIMIZE, which enlarges the window to the size of the screen. Window sizing icon 129 provides a fast way to use a mouse or pointing device 133 to perform the actions of MINIMIZE and MAXIMIZE without requiring a menu.

Action bar 117 contains a list of the actions of the application shown in the window. Each action in the list in the action bar has an associated pull-down menu to list the individual actions that are contained within each general action listed in the action bar 117. For example, the FILE pull-down enables the user to work with files through actions that manipulate the file as a whole. The individual actions contained within the FILE action include NEW, which allows users to create a new file, and SAVE, which writes the existing file to a storage device.

Figure 3:
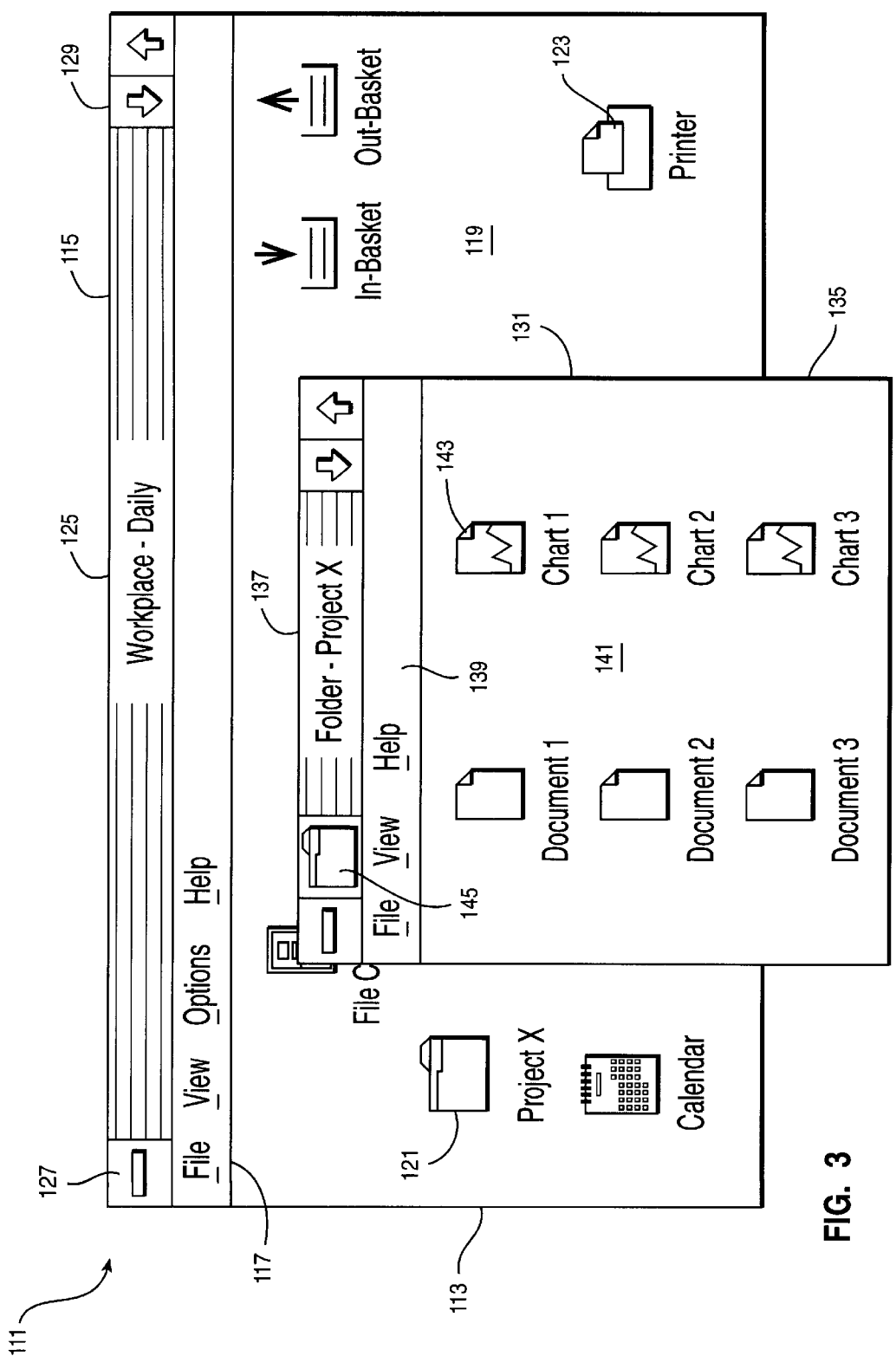
FIG. 3 is a more detailed representation of the GUI of FIG. 2 wherein the user has opened one of the objects on the workplace such that a window associated with that particular object is now displayed.

Turning now to FIG. 3, there is shown in addition to window 111, an object window 131. Object window 131 contains the contents of the "project X" folder represented by icon 121. Window 131 was opened by operating the pointer 133 to open icon 121.

Window 131 is similar to window 111 in that it includes a frame 135, a title bar 137, an action bar 139, and a client area 141 that is populated with a plurality of document and chart icons, including a "chart 1" icon 143. Title bar 137 of window 131 includes a title bar mini-icon 145 which is a copy of "project X" icon 121. Window title bar mini-icon 145 is placed in the title bar, rather than in the client area 141 of window 131, but is also capable of being directly manipulated by the user.

Figure 4:
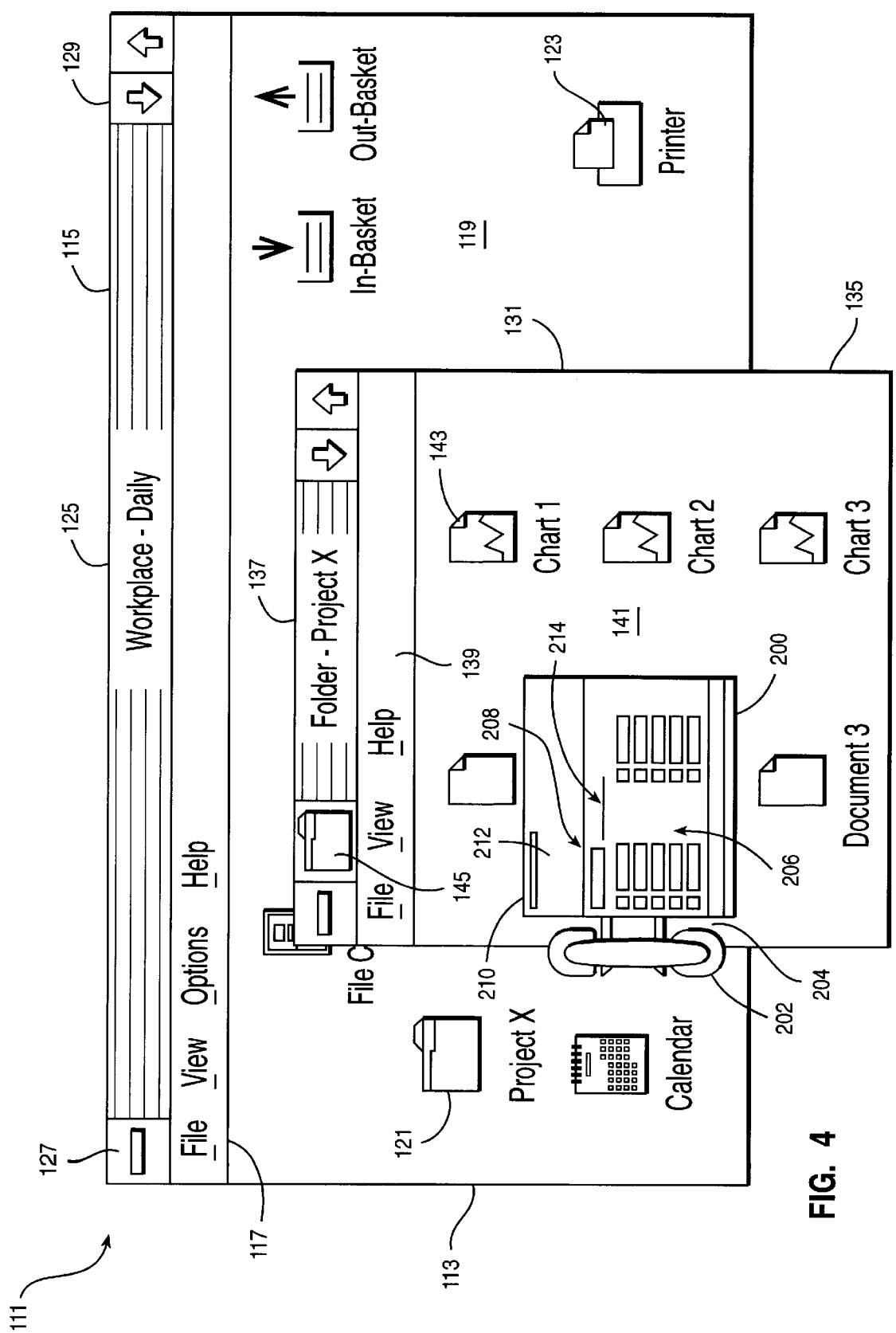
FIG. 4 is another detailed representation of the GUI of FIG. 2 showing the workplace window, the window corresponding to the open object of FIG. 3 and the real-world object of the present invention.

Referring to FIG. 4, workplace window 111 is once again shown having object window 131 opened such that a user can interact with the document associated with Project X. An additional window 200 has also been opened which is in the form of a "real world" window. In this example, real world object 200 is a representation of a telephone. It can be seen that telephone object 200 is surrounded by an irregularly shaped frame 210 which encompasses the object. Those skilled in the art will understand that FIG. 4 merely shows a telephone object as an example. Thus, the present invention is not limited to telephone objects, but contemplates all real world type objects which can be created using the system and methods of the present invention.

Telephone object 200 is seen to include a handset 202, speed dial functions 206 and a toggle switch 208. Further, it can be seen that the telephone object window 200 is irregularly shaped and includes curved and rounded edges which are known to be extremely difficult to render on the display of a data processing system. For example, it can been seen that the area 204 is not part of the telephone object 200, but is substantially enclosed by the distance between the handset and the body of the telephone object 200.

Further, it should be noted that telephone object 200 is not merely a bitmap representation of a telephone, but is a functional window in the same manner as workplace window 111 and object window 131. For example, the telephone may be answered upon receipt of an incoming call by clicking on handset 202. Additionally, a telephone number can be dialed by selecting one of the names associated with speed dial functions 206. An entry portion 212 allows a user to enter the number or numbers to be dialed when placing an outgoing call which has not been set up for speed dialing. A volume control 214 is provided as a slide switch that allows a user to control the sound volume which another party participating in a telephone call using object 200 can be heard. The preceding functions are given as examples of the types of controls available to be used when object 200 is a real world working telephone. Of course, other functions would be present when the object emulates other real world items, such as a fax machine, compact disk players, or the like.

Therefore, it can be seen when considering the functional elements of object 200 that this telephone represents an operational window in the same manner as window 111 and 131. However, the real world object 200 does not include such control items as action bar 117, title bar 137, action bar 139, window sizing icons 129 or the like. That is, the functionality provided in a conventional window by such items as title bars, action bars and pull-down menus, is provided by the real world functional controls of, in this case, a telephone. For example, to place a call the user clicks on handset 202 when using the present invention. In normal real world calling, the user would physically pick up the handset to begin speaking. Thus, there is a direct correlation between the action that a user of the present invention implements and the real world action that a person placing a telephone call on a physical telephone will make. Of course, the actions provided by telephone object 200 could be implemented in a non-real world object through the use of action bars, pull-down menus and selection of various operational actions, however, this conventional technique would require additional user actions and time before the desired result is obtained (placing a telephone call).

Figure 5A:
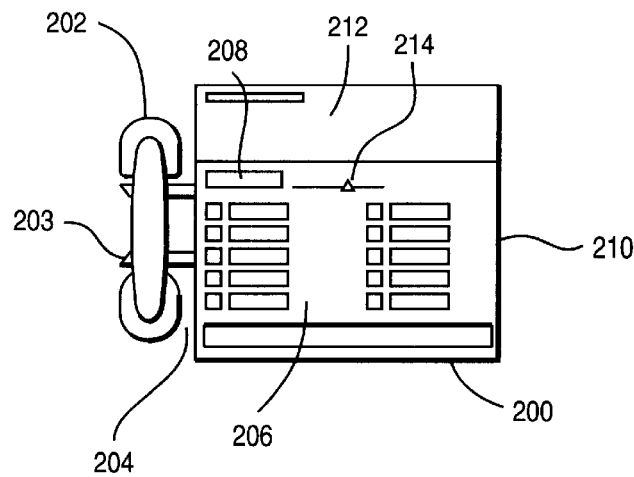
FIGS. 5A, 5B and 5C are various representations of the real-world object of the present invention in different functional states.

Next turning to FIG. 5, three separate telephone objects 200 are shown at various operational stages. In FIG. 5A, phone object 200 is shown essentially as was previously described with regard to FIG. 4. Therefore, FIG. 5A will not be described again at this time.

Figure 5B:
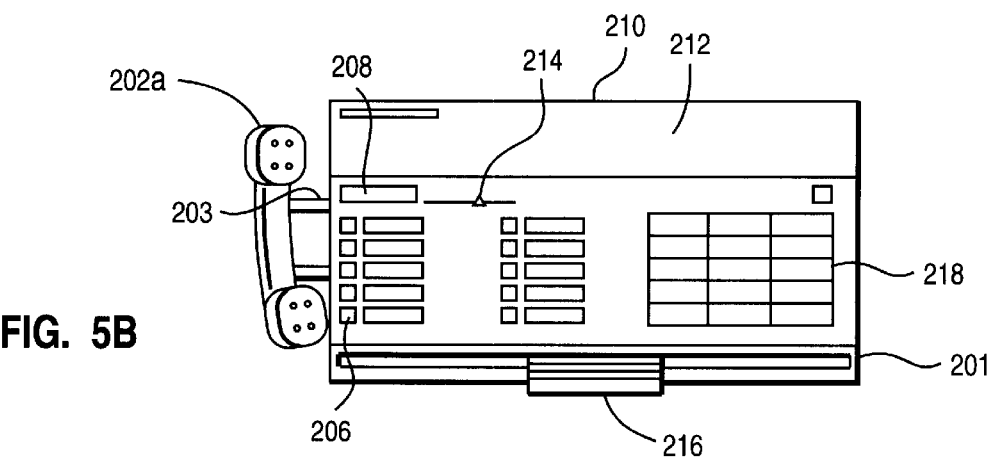
Figure 5C:
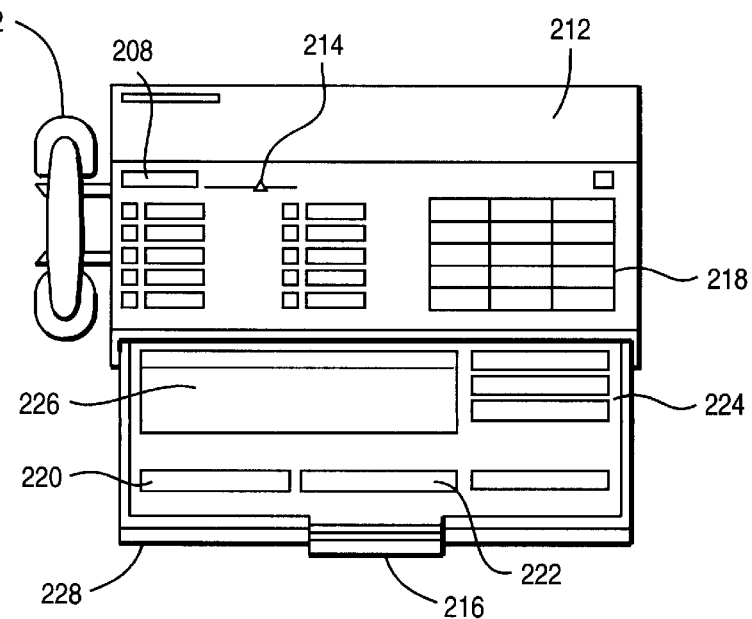

FIG. 5B is an enlarged version of telephone object 200 and shown by reference numeral 201. In addition to the various components shown by telephone object 200 of FIG. 5A, object 201 includes a number pad 218 which allows a user to enter telephone numbers to be called. Additionally, entry pad 218 includes a redial, flash and mute buttons for performing other functions associated with a real world telephone. Again, toggle switch 208 is shown which is used to display a different representation of the telephone object 201, such as changing between a two-dimensional and three-dimensional object. Handset 202*a* is shown in the active state since it is turned to face a user and is not shown as resting on cradle 203. A pullout drawer handle 216 is shown which allows additional functions to be presented to a user of telephone object 201. By selecting the arrow associated with pullout drawer 216, drawer 228 is opened. In this case, the functions included in drawer 228 relate to setting speed dial numbers and buttons 206. Name field 220 allows a user to enter the name of the person to be added to one of the speed dial buttons 206. Number field 222 allows a user to enter the telephone number to be associated with the name of the person previously entered in field 220. The name and number is then included in a list box 226 which associates the name and telephone number with one another. Functional keys 224 then allow the user to associate the entered name and number with one of the speed dial buttons 206. Additionally functional buttons 224 allow a user to select various operations such as dialing the person just added to the speed dial function, delete a person's name and number from the speed dial function, or the like. Upon completion of the speed dial activity, a user selects drawer tab 216 and the drawer is then closed such that the telephone object 201 of FIG. 5*c* returns to the appearance shown in FIG. 5*b*, as previously described.

Figure 6:
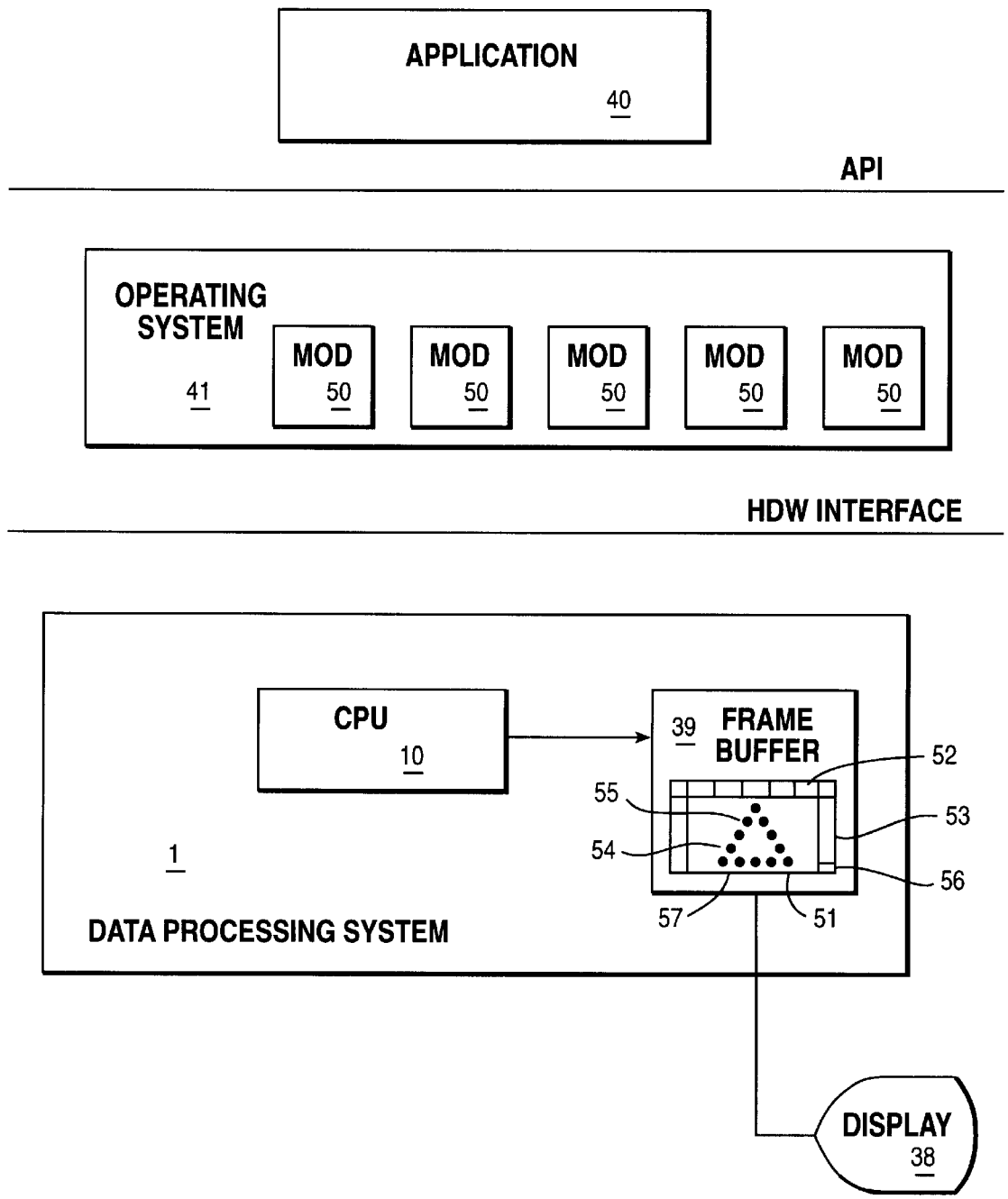
FIG. 6 is an architectural diagram of the various components which implement the present invention.

Referring to FIG. 6, an architectural block diagram is shown with application 40 running on top of an operating system 41. Application 40 may include one of the word processing applications, such as WordPerfect, Word, WordPro, or the like. Application 40 interacts with an operating system 41 through an application programming interface (API). Operating system 41 may include one of the Window's operating system from Microsoft Corporation, as well as OS2 from the IBM Corporation. Application 40 calls various functional routines included within operating system 41. These routines are shown as modules 50 included in the operating system. In the case of the Window's operating system, modules 50 can be characterized as dynamic link libraries (DLLs) which interpret a call from the application 40 and then, in response thereto, perform the desired function. For example, application 40 may issue a draw triangle command. Operating system 41 then routes this command to the appropriate module 50 that performs the draw triangle function. The appropriate module 50 then outputs hardware instructions to data processing system 1 to implement the draw triangle command. Operating system 41 and data processing system 1 interact through a hardware interface. A compiler outputs the hardware instructions to the data processing system 1, particularly central processing unit 10 where the instructions are decoded and executed on various processing, or execution units in the CPU (not shown). As noted in FIG. 1, data processing system 1 includes a frame buffer 39 located in display adapter 36. Frame buffer 39 is a storage device which holds information relating to each picture element (pixel) of a display screen 38. The information in frame buffer 9 corresponding to each individual pixel will cause that pixel to be painted, with a particular color or shade. The information stored in frame buffer 39 is then provided to a monitor 38 for display to a user of the data processing system.

In particular, frame buffer 39 may store information relating to a window 51 to be rendered on display 38. Conventional window 51 would include elements such as a title bar 52, border 53, sizing element 56 such as an arrow, and the like. Next, the triangle 54 is shown displayed inside of window 51 by illuminating pixels 55 to form the shape of a triangle as requested by application 40. The present invention provides a window in the form of a real world object which does not include borders 53, title bar 52 and frame 57 of window 51.

In typical graphical user interfaces (GUIs), everything is presented in window form. In these GUIs, a window can consist of rectangular items including a size border, rectangular client, menu and title bar. The rectangular client is typically a window such as the object window 131 previously described with regard to FIG. 3. The preceding items are not found in real world objects such as telephone, book, fax machine, or the like that sits upon a user's desk. Ideally, real world objects appearing on a GUI desktop should be as similar to what is found in real life as possible.

To create real world objects on a GUI desktop, we will begin with creation of an image of the object to be represented in some format such as a bitmap. This image will represent much of the form of the real world object.

As a first step in creating the real world object bitmap image, set the background pixels (those pixels that are not part of the real world object) of the bitmap all to the same color which is different from any color found in the real world object. Next, when loading the bitmap at runtime, parse the bitmap to create a region including the area that the real world object is found in the bitmap. This region is the union of a series of horizontal lines where each line maps to the pixels within the real world object on that line in the bitmap.

An application window (one with size borders, title bar, menu bar and the like) is then created on the desktop where the client size is the same dimensions as the bitmap. That is, the rectangular client will be of a size sufficient to encompass the bitmap image, wherein each of the four sides of the rectangular client will tangentially be in contact with a pixel of the bitmap image. The bitmap image will then be drawn within the client. By making the bitmap image to be of the same dimensions as the rectangular, the program application will then recognize the bitmap image as a controllable window such that user interaction with the bitmap image of the real world object can occur and implement the various functions displayed by controls on the real world object. For example, when a user selects the speed dial button, the application will recognize this selection and implement the functions associated with dialing a telephone, e.g. obtain the desired telephone number, access the telephone line and the like. For other functions, such as storing the predetermined telephone numbers in memory, the application may interact with the operating system software.

The clipping region of the application window is then set to be the same region that was created from parsing the bitmap. This function may be included in a particular operating system. As an example, the Windows '95 or Windows NT operating system uses a SetWindowRgn API. The use of this function results in everything except the area within the client including the bitmap region to be clipped out thus removing the window size borders, title bar, menu bar and the like. A real world object is now present and displayed on the GUI desktop.

Figure 7B:
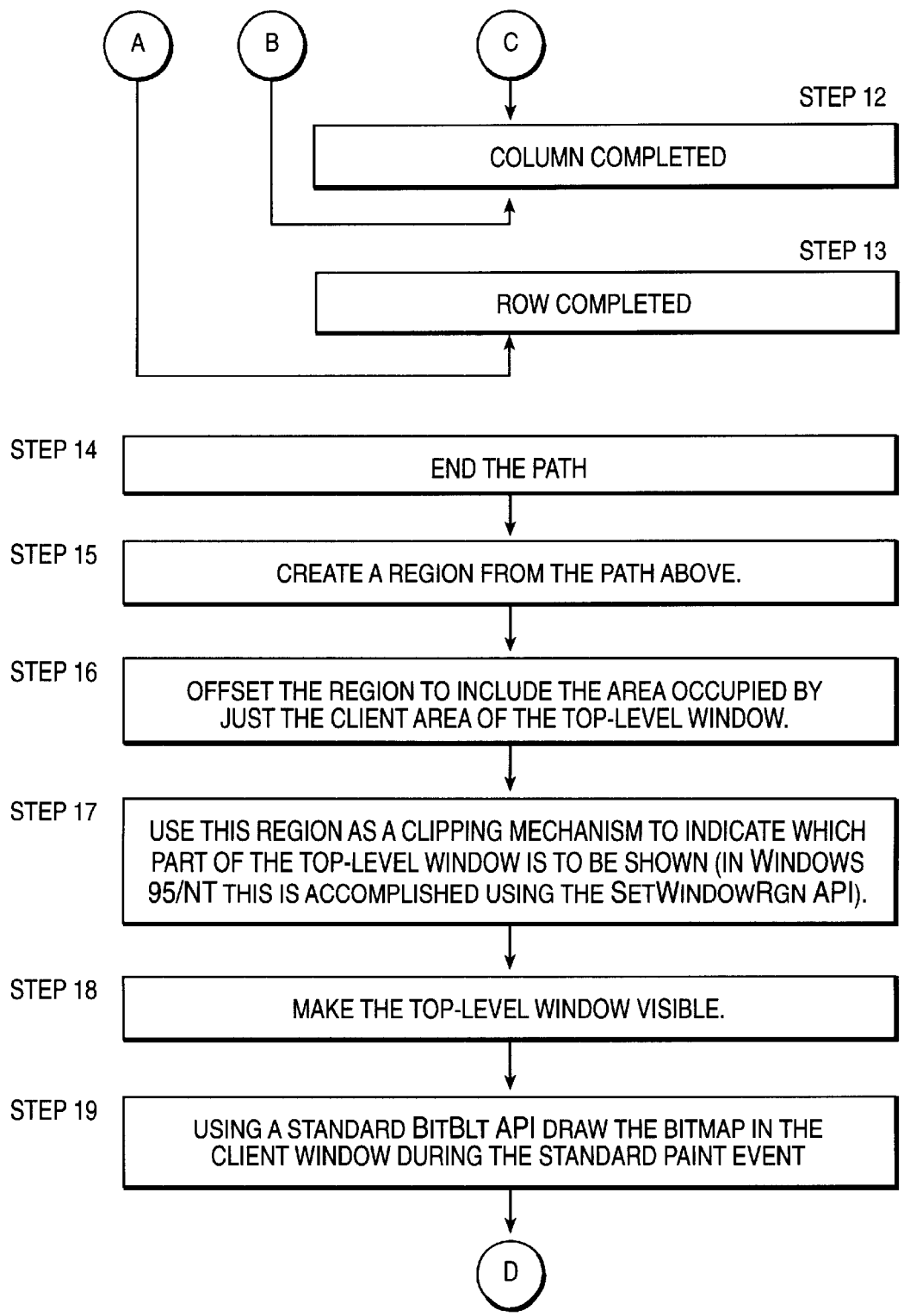
Figure 7C:
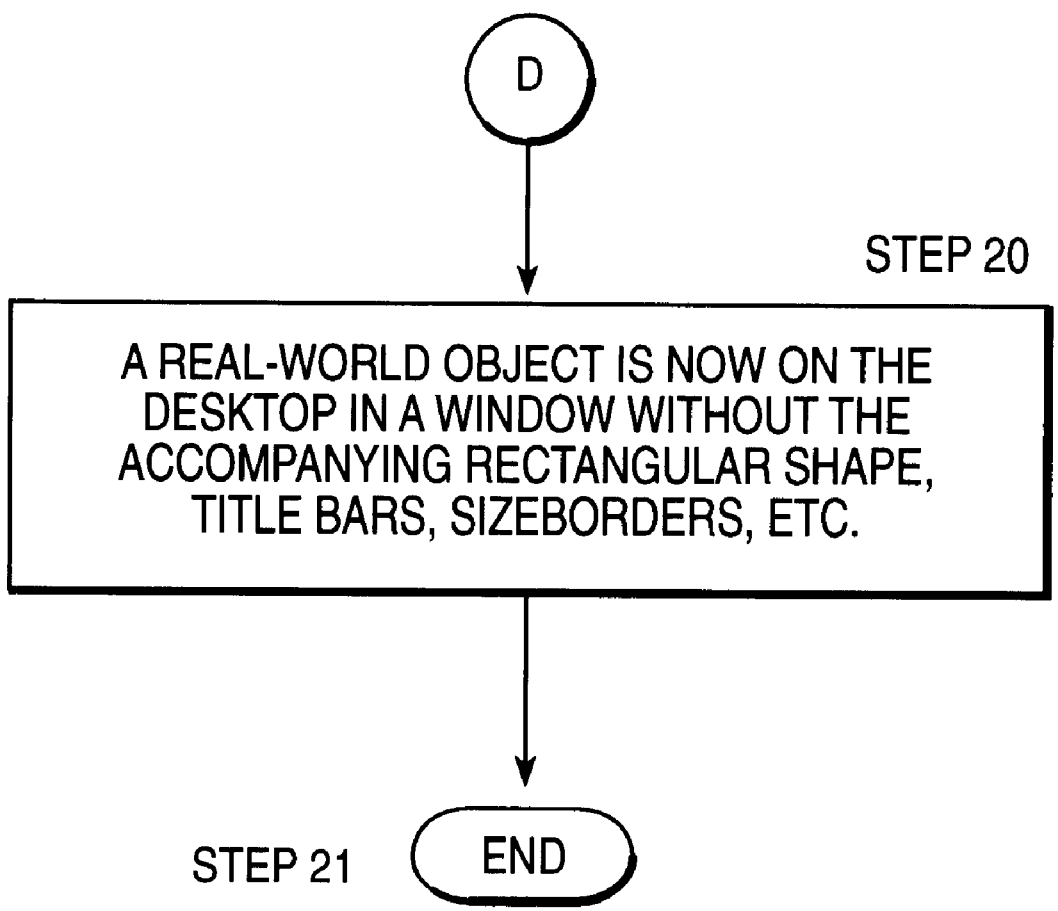

The flowcharts of FIGS. 7A, 7B and 7C will now be described. At step 1, the process is started and at step 2 a bitmap is created that contains an image of the real world object wherein the background color should be all the same color and of a color which is not found in the object itself. The bitmap is then loaded into the software program, i.e. the Windows operating system, at step 3. A top level window is then created at step 4 which includes size borders, title bar, and the like. At step 5, the window is generated to be of a client size of the same dimensions as the bitmap image that was previously loaded. That is, each side of the window will contact at least one pixel of the bitmap image. The bits are then loaded (step 6). At step 7, a drawing device context (DC) for the window is then obtained and a path is begun within the drawing device context (step 8). For each row of bits in the bitmap (step 9) and each column of bits in the bitmap (step 10), the process looks for, or identifies bits that are part of the real world object (step 11). Also, at step 11, lines are drawn within the device context that connect the bits on this line that are part of the real world object. Once each column of bits has been completed (step 12) and the row of bits completed at step 13, the path within the drawing device context ends at step 14.

At step 15, a region is created from the path begun at step 8. The region is then offset to include the area occupied by the minimum amount of the client area of the top level window (step 16). This region is then used as a clipping mechanism to indicate which part of the top level window is to be shown, and correspondingly, which is to be clipped out (removed or eliminated) at step 17. The top level window is then drawn on the display screen of the computer system at step 18, a draw routine is then used to paint the bitmap in the client window during a standard drawing event (step 19). At step 20, a real world object is now shown on a desktop in a window without the accompanying rectangular shape, title bars, size borders, menu bars, pulldown menus, and the like. Subsequent to step 20, the process continues to step 21 and ends.

Although certain preferred embodiments have been shown and described it should be understood that many changes and modifications may be made therein without departing from the scope of the appended claims.

What is claimed is:

1. A method of creating an interactive non-rectangular object for display on a data processing system having a program application running thereon, comprising the steps of:

creating a bitmap image of said non-rectangular object;
   loading said bitmap image of the non-rectangular object in a standard window generated by said program application, said standard window having a size border, a rectangular client, a menu, a title bar, etc.;
   causing said bitmap image of the non-rectangular object to be controllable by said program application; and
   removing areas of said standard window that are not part of said bitmap image of said non-rectangular object.

2. A method according to claim 1 wherein said step of removing comprises the steps of:

identifying the areas of said standard window to be removed; and
   clipping said areas to be removed from said standard window.

3. A method according to claim 2 wherein said step of causing comprises the step of minimizing a size of said standard window until each side contacts at least one pixel of said bitmap image of said non-rectangular object, wherein said program application recognizes said non-rectangular object as a controllable window.

4. A method according to claim 3 wherein said step of identifying comprises the step of determining, for each row and column of bits in the bitmap image, whether said bits are part of the non-rectangular object.

5. A method according to claim 4 wherein said step of identifying further comprises the step of creating a region from the bits of said bitmap image which were determined to be part of the non-rectangular object.

6. A method according to claim 5 wherein said step of removing further comprises the step of using said region to indicate which part of the standard window is to be visible.

7. A data processing system including a program application for creating an interactive non-rectangular object to be displayed on said data processing system, comprising:

means for creating a bitmap image of said non-rectangular object;
   means for loading said bitmap image of the non-rectangular object in a standard window generated by said program application, said standard window having a size border, a rectangular client, a menu, a title bar, etc.;
   means for causing said bitmap image of the non-rectangular to be controllable by said program application; and
   means for removing areas of said standard window that are not part of said bitmap image of said non-rectangular object.

8. A system according to claim 7 wherein said means for removing comprises:

means for identifying the areas of said standard window to be removed; and
   means for clipping said areas to be removed from said standard window.

9. A system according to claim 8 wherein said means for causing comprises means for minimizing a size of said standard window until each side contacts at least one pixel of said bitmap image of said non-rectangular object, wherein said program application recognizes said non-rectangular object as a controllable window.

10. A system according to claim 9 wherein said means for identifying comprises means for determining, for each row and column of bits in the bitmap image, whether said bits are part of the non-rectangular object.

11. A system according to claim 10 wherein said means for identifying further comprises means for creating a region from the bits of said bitmap image which were determined to be part of the non-rectangular object.

12. A system according to claim 11 wherein said means for removing further comprises comparison means for using said region to indicate which part of the standard window is to be visible.

13. A system according to claim 12 wherein said means for clipping comprises a remove window region application programming interface call.

14. A computer program for creating an interactive non-rectangular object to be displayed on a data processing system using functional data structures on a computer readable medium, comprising:

means for creating a bitmap image of said non-rectangular object;
   code means, embodied in said functional data structures, for loading said bitmap image of the non-rectangular object in a standard window generated by said program application;
   code means, embodied in said functional data structures, for causing said bitmap image of the non-rectangular object to be controllable by said program application, said standard window having a size border, a rectangular client, a menu, a title bar, etc.; and code means, embodied in said functional data structures, for removing areas of said standard window that are not part of said bitmap image of said non-rectangular object.

15. A program according to claim 14 wherein said code means for removing comprises:

means for identifying the areas of said standard window to be removed; and means for clipping said areas to be removed from said standard window.

16. A program according to claim 15 wherein said code means for causing comprises means for minimizing a size of said standard window until each side contacts at least one pixel of said bitmap image of said non-rectangular object, wherein said program application recognizes said non-rectangular object as a controllable window.

17. A program according to claim 16 wherein said means for identifying comprises means for determining, for each row and column of bits in the bitmap image, whether said bits are part of the non-rectangular object.

18. A program according to claim 17 wherein said means for identifying further comprises means for creating a region from the bits of said bitmap image which were determined to be part of the non-rectangular object.

19. A program according to claim 18 wherein said code means for removing further comprises comparison means for using said region to indicate which part of the standard window is to be visible.

* * * * *